(12) United States Patent
Kajio

(10) Patent No.: US 10,571,029 B2
(45) Date of Patent: Feb. 25, 2020

(54) FLUID CONTROL VALVE

(71) Applicant: AISIN SEIKI KABUSHIKI KAISHA, Kariya-shi, Aichi-ken (JP)

(72) Inventor: Katsuhiro Kajio, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 75 days.

(21) Appl. No.: 16/004,993

(22) Filed: Jun. 11, 2018

(65) Prior Publication Data

US 2018/0363783 A1     Dec. 20, 2018

(30) Foreign Application Priority Data

Jun. 14, 2017   (JP) .................... 2017-116998

(51) Int. Cl.
  *F16K 1/36*    (2006.01)
  *F16K 1/48*    (2006.01)
  *H01M 8/04089* (2016.01)
(52) U.S. Cl.
  CPC .............. *F16K 1/36* (2013.01); *F16K 1/48* (2013.01); *H01M 8/04089* (2013.01)
(58) Field of Classification Search
  CPC ................................. F16K 1/36; F16K 1/48
  USPC .................................................... 251/86
  See application file for complete search history.

(56) References Cited

U.S. PATENT DOCUMENTS

| | | | | |
|---|---|---|---|---|
| RE8,368 E | * | 8/1878 | Powell | 251/86 |
| 372,641 A | * | 11/1887 | Robertshaw | F16K 1/482 |
| | | | | 251/86 |
| 1,226,040 A | * | 5/1917 | Whitbeck | F16K 1/482 |
| | | | | 251/86 |
| 1,584,975 A | * | 5/1926 | Brenner | F01L 3/20 |
| | | | | 251/86 |
| 2,919,884 A | * | 1/1960 | Meusy | F16K 1/36 |
| | | | | 251/86 |
| 3,406,706 A | * | 10/1968 | Zakka | F16K 1/14 |
| | | | | 137/331 |
| 4,647,011 A | * | 3/1987 | Contzen | F16K 31/0655 |
| | | | | 251/129.15 |

(Continued)

FOREIGN PATENT DOCUMENTS

| | | |
|---|---|---|
| JP | 2013-87803 A | 5/2013 |
| JP | 5544868 B2 | 7/2014 |

(Continued)

*Primary Examiner* — Umashankar Venkatesan
(74) *Attorney, Agent, or Firm* — Buchanan Ingersoll & Rooney PC

(57) ABSTRACT

A fluid control valve includes a shaft member configured to move along an axis by drive force from a drive source, and a holding member including a cylindrical portion in which a second end portion of the shaft member is placed by insertion with a predetermined clearance provided in a radial direction. The holding member includes a valve element and a seal member. The fluid control valve includes a housing including an inlet port, an outlet port and a valve seat. The cylindrical portion includes a protrusion protruding radially inward. The second end portion of the shaft member includes a first region including a first contact portion configured to be in contact with a bottom portion of the cylindrical portion. The second end portion of the shaft member includes a second region including a second contact portion being in contact with the protrusion.

10 Claims, 7 Drawing Sheets

(56) References Cited

U.S. PATENT DOCUMENTS

| | | | | |
|---|---|---|---|---|
| 2012/0208102 A1* | 8/2012 | Schumm, Jr. | ..... | H01M 8/04089 429/444 |
| 2013/0092860 A1* | 4/2013 | Kiku | ........................ | F16K 1/36 251/314 |
| 2015/0008353 A1* | 1/2015 | Kiku | ........................ | F16K 7/12 251/331 |
| 2018/0073642 A1* | 3/2018 | Kajio | ........................ | F16K 1/12 |

FOREIGN PATENT DOCUMENTS

| | | |
|---|---|---|
| JP | 2016-13721 A | 1/2016 |
| JP | 5849594 B2 | 1/2016 |
| JP | 5849595 B2 | 1/2016 |
| JP | 5849596 B2 | 1/2016 |
| JP | 2018-40486 A | 3/2018 |

* cited by examiner

FLUID CONTROL VALVE

CROSS REFERENCE TO RELATED APPLICATIONS

This application is based on and claims priority under 35 U.S.C. § 119 to Japanese Patent Application 2017-116998, filed on Jun. 14, 2017, the entire content of which is incorporated herein by reference.

TECHNICAL FIELD

This disclosure generally relates to a fluid control valve.

BACKGROUND DISCUSSION

A fluid control valve of a poppet valve type is conventionally known, which controls a flow amount of air to be supplied to each of various equipment and apparatuses (for example, a fuel cell) that are mounted on a vehicle (for example, refer to JP2013-87803A which will be hereinafter referred to as Patent reference 1).

A fluid control valve disclosed in Patent reference 1 includes a shaft member (which is referred to as a valve shaft in Patent reference 1), a holding member (which is referred to as a valve frame in Patent reference 1) and a housing (which is referred to as a valve housing in Patent reference 1). The shaft member moves along an axis by drive force of a drive source. The holding member includes a cylindrical portion in which an end portion of the shaft member is placed by insertion with a predetermined clearance provided in a radial direction. The holding member includes a valve element extended from the cylindrical portion towards an outer side in the radial direction. The housing includes an annular valve seat with which the valve element is in contact.

According to the fluid control valve disclosed in Patent reference 1, a rotatable sphere is disposed in a through hole formed at the end portion of the shaft member and the holding member is clinched from the outside so as to secure the sphere, and thus the holding member can swing or pivot relative to the shaft member. As a result, when the valve element is closed, even in a case where parallelisms of the valve element and the valve seat do not coincide with each other due to fluid pressure that the valve element receives from the fluid and/or dimensional error of components, a seal member of the valve element is configured to be pressed against the valve seat over the entire circumference by being applied with the drive force in a forward direction.

The known fluid control valve includes a high sealing performance because the valve element pivots relative to the shaft member and thus the seal member of the valve element is pressed against the valve seat over the entire circumference, however, a manufacturing cost increases because the through hole needs to be machined at the end portion of the shaft member and the sphere needs to be arranged thereat. In addition, because the sphere is secured by clinching the holding member from the outside, a position accuracy of the clinched portion is required, which makes the process difficult.

A need thus exists for a fluid control valve which is not susceptible to the drawback mentioned above.

SUMMARY

A fluid control valve includes a shaft member including a first end portion and a second end portion, the shaft member is configured to move along an axis by drive force from a drive source connected to the first end portion. The fluid control valve includes a holding member including a cylindrical portion which is formed in a bottomed cylindrical shape and in which the second end portion of the shaft member is placed by insertion with a predetermined clearance provided in a radial direction between the cylindrical portion and the second end portion of the shaft member, the holding member includes a valve element configured by a main body portion formed in a plate shape extended radially outward from the cylindrical portion and a seal member fixed to an outer circumferential portion of the main body portion. The fluid control valve includes a housing including an inlet port for fluid, an outlet port for the fluid, and a valve seat formed in an annular shape wherein the valve element is configured to be in contact with the valve seat such that communication between the inlet port and the outlet port is blocked, the housing accommodates the shaft member and the holding member. The cylindrical portion includes a protrusion protruding radially inward. The second end portion of the shaft member includes a first region including a diameter reduced towards a bottom portion of the cylindrical portion, the first region includes a first contact portion configured to be in contact with the bottom portion. The second end portion of the shaft member includes a second region including a diameter reduced from a boundary surface between the first region and the second region towards a side opposite to the bottom portion, the second region includes a second contact portion being in contact with the protrusion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a fluid control valve disclosed here will be explained with reference to the drawings. In the embodiment, as an example, the explanation is made on an air pressure control valve 3 (an example of the fluid control valve) arranged in an oxygen supply module 2 of a fuel cell system 1. However, the disclosure is not limited to the embodiment below and can be modified in various ways without departing from the spirit and scope of the disclosure.

Figure 1:
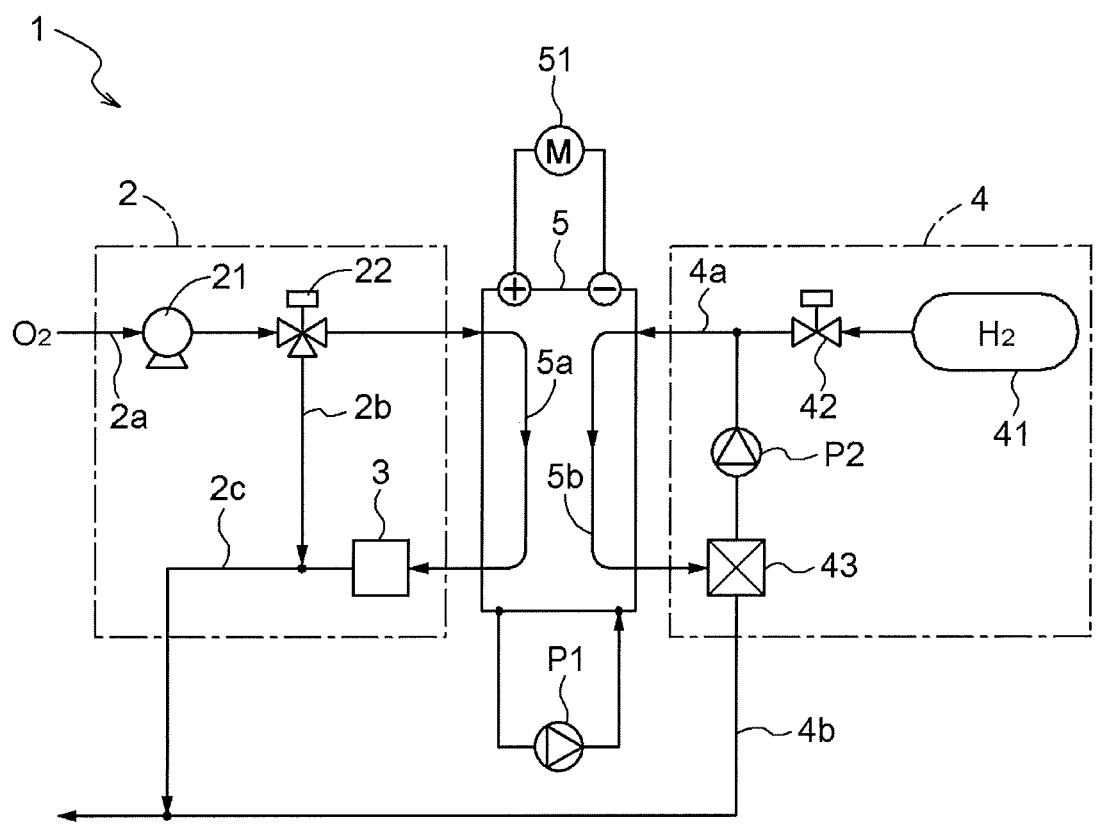
FIG. 1 is a schematic view illustrating a fuel cell system of an embodiment disclosed here.

(Fuel cell system) As illustrated in FIG. 1, in the embodiment, an electric motor 51 is used as a drive source of an automobile and/or a vehicle including general industrial machinery, for example. The electric motor 51 is supplied with electric power generated in the fuel cell system 1. The fuel cell system 1 includes a fuel cell 5, the oxygen supply module 2 supplying air to the fuel cell 5, and a fuel supply module 4 supplying hydrogen gas to the fuel cell 5. No particular limitation is given to the above configuration, and surplus electric power may be charged to a battery while the electric power generated at the fuel cell 5 is supplied to the motor 51.

The fuel cell 5 is formed of cell units laminated or stacked in series with each other. In the cell unit, cells each including a fuel electrode, an air electrode, and electrolyte interposed between the fuel electrode and the air electrode are partitioned or separated by separators. The separator facing the air electrode is provided with an air flow passage 5a through which air including oxygen flows. The separator facing the fuel electrode is provided with a hydrogen flow passage 5b through which hydrogen gas flows. In the fuel cell 5, the hydrogen gas becomes hydrogen ion and passes through the electrolyte, and chemical reaction of the hydrogen ion with oxygen occurs, thereby to generate water (vapor). The fuel electrode corresponds to a cathode and the air electrode corresponds to an anode, and the electric power is supplied to the electric motor 51. Coolant water is circulated by a water pump P1 to cool the fuel cell 5.

The oxygen supply module 2 includes an air supply passage 2a through which the air including oxygen is supplied to the fuel cell 5 by a compressor 21. The air supply passage 2a is connected to the air flow passage 5a of the fuel cell 5. A three-way valve 22 is provided between the compressor 21 and the air flow passage 5a. A first end portion of a by-pass flow passage 2b is connected to the three-way valve 22 and a second end portion of the by-pass flow passage 2b is connected to an oxygen-side discharge passage 2c. By changing a valve position of the three-way valve 22, part of air is discharged to the oxygen-side discharge passage 2c via the by-pass flow passage 2b, and thus an amount of air supplied to the air flow passage 5a of the fuel cell 5 is controlled. The air supply passage 2a is appropriately provided with an air filter removing foreign matters included in the air and/or an intercooler cooling the air compressed by the compressor 21.

A first end portion of the oxygen-side discharge passage 2c is connected to an outlet of the air flow passage 5a of the fuel cell 5 and a second end portion of the oxygen-side discharge passage 2c is joined to a fuel-side discharge passage 4b which will be explained below. Through the oxygen-side discharge passage 2c, air which has not been used in the power generation and/or the water (vapor) generated by the power generation are discharged. The air pressure control valve 3 of the embodiment is arranged on the route of the oxygen-side discharge passage 2c to be positioned between the outlet of the air flow passage 5a of the fuel cell 5 and the second end portion of the by-pass flow passage 2b. The air pressure control valve 3 controls an amount of emission of the air remaining inside the fuel cell 5, thereby controlling internal pressure of the fuel cell 5. The configuration of the air pressure control valve 3 will be explained below in detail.

The fuel supply module 4 includes a hydrogen supply flow passage 4a through which the hydrogen gas is supplied from a hydrogen tank 41 to the hydrogen flow passage 5b of the fuel cell 5. A shut-off valve 42 is provided at the hydrogen supply flow passage 4a, and the shut-off valve 42 shuts off the supply of the hydrogen gas when the vehicle makes an emergency stop. The fuel-side discharge passage 4b is connected to an outlet of the hydrogen flow passage 5b. Nitrogen which has mainly passed through from the air electrode and includes a small amount of hydrogen gas, and and/or the water (vapor) which has passed through the electrolyte are discharged through the fuel-side discharge passage 4b.

A gas-liquid separator 43 is provided on the route of the fuel-side discharge passage 4b. The hydrogen gas and the water are separated from each other at the gas-liquid separator 43. The hydrogen gas separated at the gas-liquid separator 43 is circulated, by a circulation pump P2, in a downstream side of the hydrogen supply flow passage 4a relative to the shut-off valve 42, and then is used again as fuel of the fuel cell 5. The water separated at the gas-liquid separator 43 and/or hydrogen gas which has not used in circulation are discharged to the fuel-side discharge passage 4b, are mixed with air and/or water which have flown from the oxygen-side discharge passage 2c, and then are discharged to the outside. At the fuel-side discharge passage 4b, a drain valve and/or a rarefying device are provided appropriately. The drain valve regulates an amount of water discharge of the gas-liquid separator 43. The rarefying device rarefies or dilutes the hydrogen gas with the air and is arranged at a merging portion merging with the oxygen-side discharge passage 2c.

The fuel cell system 1 is configured such that, when the vehicle starts driving, the compressor 21 supplies the air including oxygen to the air flow passage 5a, the shut-off valve 42 is opened and the circulation pump P2 is operated thereby to supply the hydrogen gas to the hydrogen flow passage 5b, and the fuel cell 5 generates the electric power. At this time, the air pressure control valve 3 is in a valve-open state so that the air pressure control valve 3 discharges the air remaining inside the fuel cell 5 and controls the internal pressure of the fuel cell 5 (refer to FIG. 2). To the contrary, when the vehicle stops driving, at the fuel cell system 1, the compressor 21 stops and there becomes no supply of the air to the air flow passage 5a, and the shut-off valve 42 is closed and the circulation pump P2 is stopped thereby to stop the supply of the hydrogen gas to the hydrogen flow passage 5b. At this time, the air pressure control valve 3 is in a valve-closed state (refer to FIG. 3).

(Fluid control valve) Next, the configuration of the air pressure control valve 3 serving as the fluid control valve of the embodiment will be explained with reference to FIGS. 2 to 7. The explanation will be made hereunder by using an upper-and-lower direction and a right-and-left direction (a lateral side) with reference to the paper surface on which FIG. 2 is drawn, however the upper-and-lower direction and the right-and-left direction do not necessarily match an actual installation direction of the air pressure control valve 3.

Figure 2:
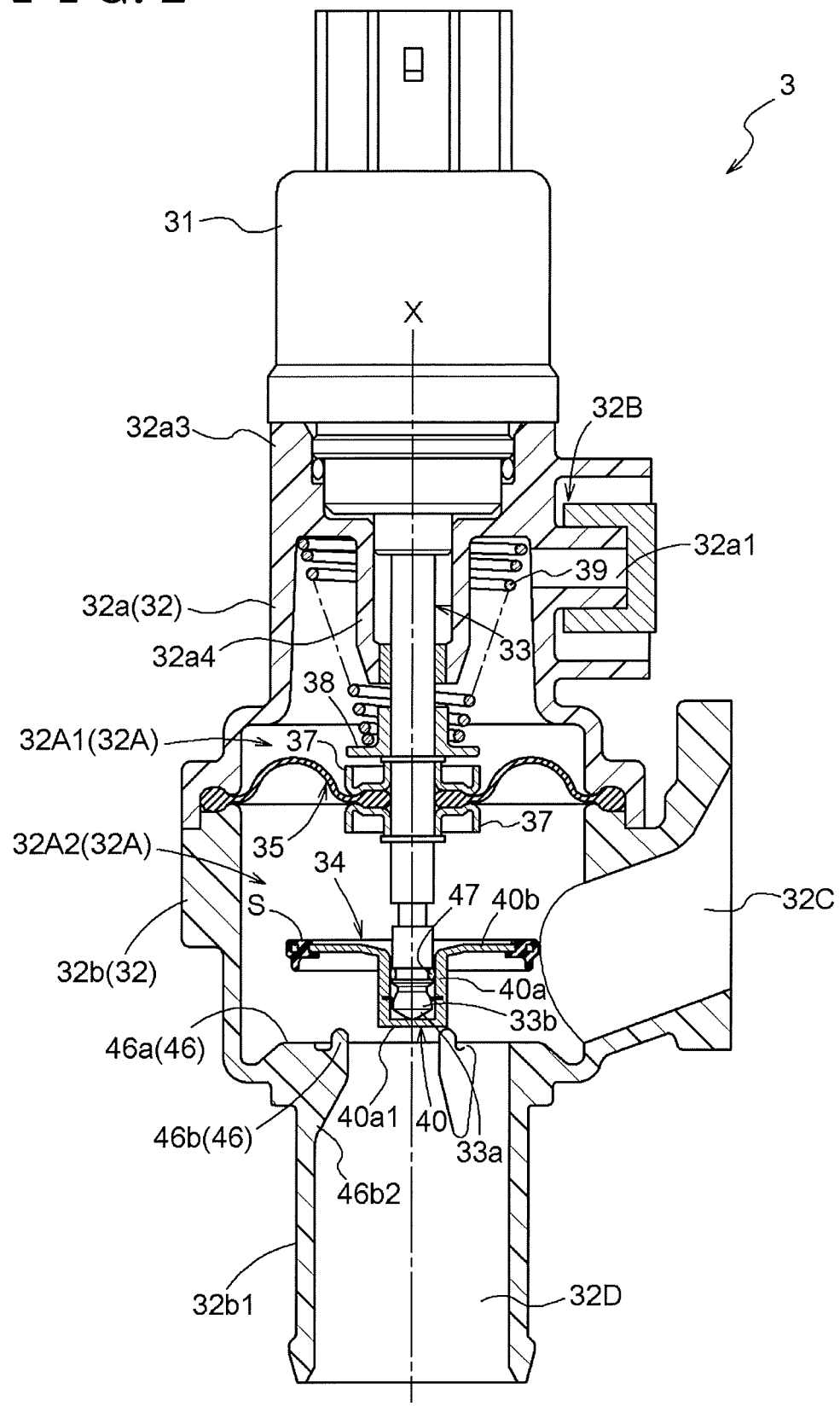
FIG. 2 is a cross-sectional view illustrating a fluid control valve disclosed here in a state where the valve is open.
Figure 3:
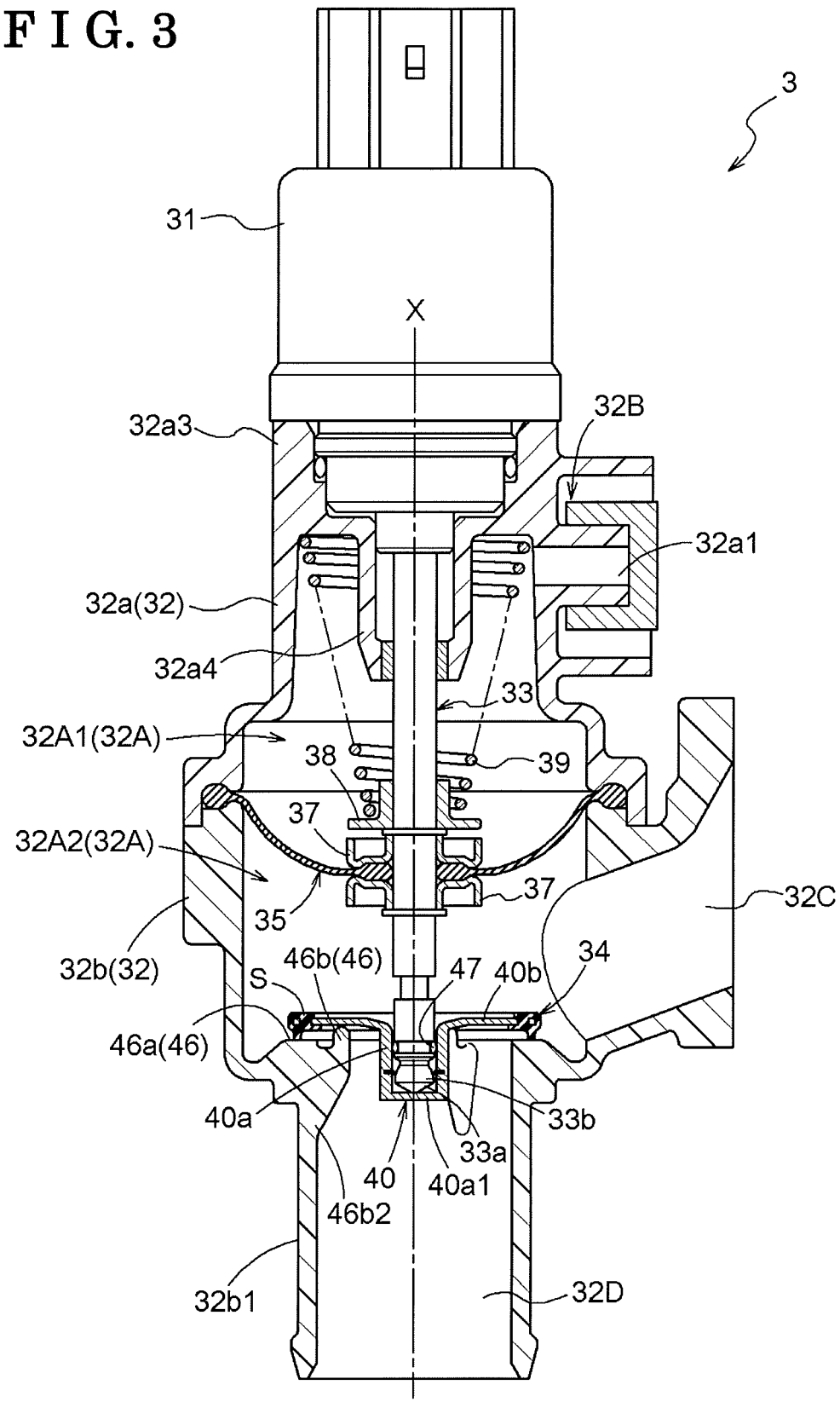
FIG. 3 is a cross-sectional view illustrating the fluid control valve in a state where the valve is closed.

As illustrated in FIG. 2, the air pressure control valve 3 includes a stepping motor 31 (an example of a drive source), a shaft member 33 made of metal and moving along an axis X by drive force supplied from the stepping motor 31 that is connected to a first end portion of the shaft member 33, a valve element 34 including a flat plate shape and connected to a second end portion of the shaft member 33, and a housing 32 made of resin and formed of an upper housing 32a and a lower housing 32b which are joined to each other. The housing 32 accommodates therein the shaft member 33 and the valve element 34.

The stepping motor 31 is fixed to the upper housing 32a in a sealed state. The stepping motor 31 is configured such that, when an output shaft of the stepping motor 31 is rotated by a screw mechanism provided at the output shaft, the shaft member 33 moves up and down along the axis X wherein the shaft member 33 is supported by the stepping motor 31 in a state of being locked from rotating. The stepping motor 31 regulates a step angle according to the number of pulses applied, and thus the stepping motor 31 can finely set a moving distance of the shaft member 33. The stepping motor 31 is a known motor and therefore detailed explanation thereof will be omitted. The drive source is not limited to the stepping motor 31 and may be configured by, for example, a brushless motor which can control a rotational angle.

The shaft member 33 is formed in a rod shape of which the first end portion is connected to the stepping motor 31 and of which the second end portion is connected to the valve element 34 formed in an annular shape. A diaphragm 35 is provided at an intermediate portion of the shaft member 33. An inner circumferential side of the diaphragm 35 is held by a fixing member 37. The diaphragm 35 is formed of base fabric and a rubber material fixed to the base fabric. A retainer 38 is arranged above the fixing member 37. A compression spring 39 is provided between the retainer 38 and the upper housing 32a. The compression spring 39 biases in a valve-closing direction of the valve element 34, and accordingly the valve element 34 is kept in the valve-closed state by the biasing force of the compression spring 39 while the vehicle is stopped driving (refer to FIG. 3).

Figure 4:
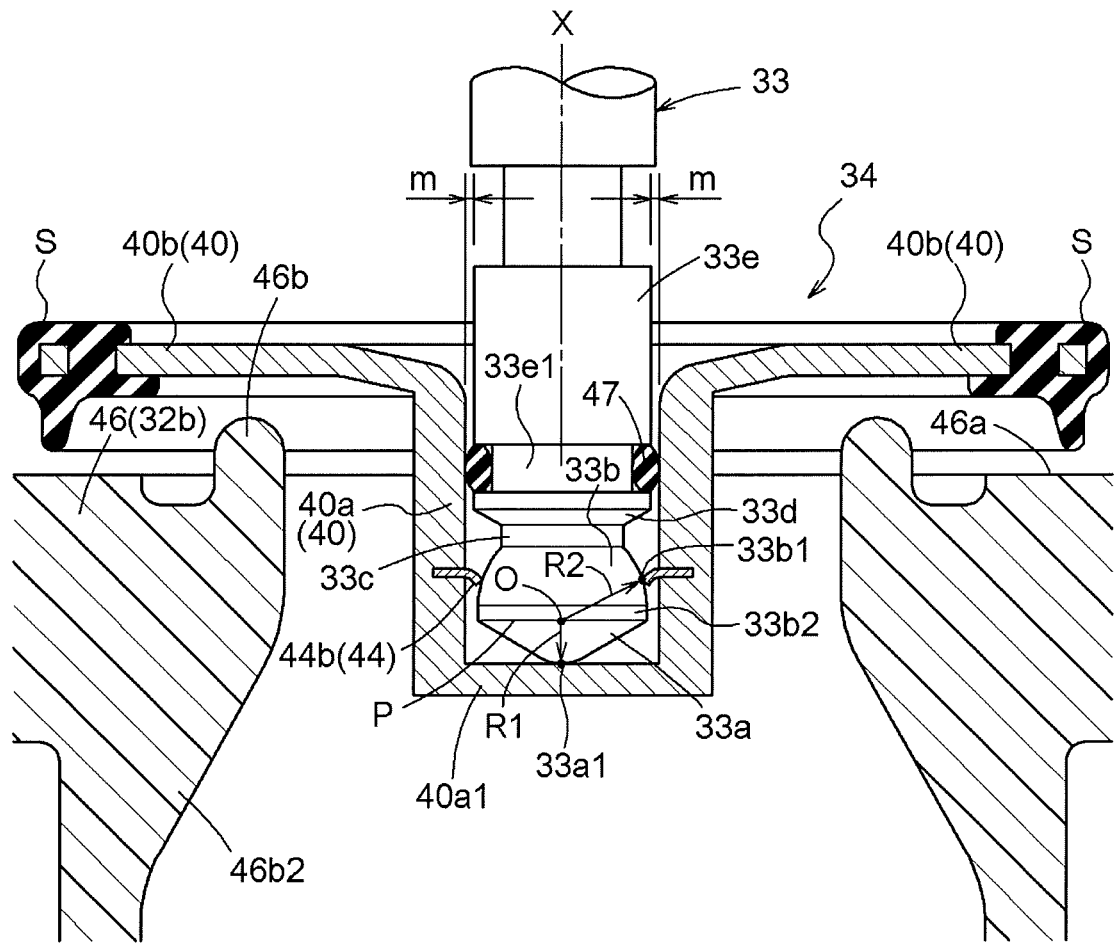
FIG. 4 is an enlarged view of a second end portion of a shaft member disclosed here.

As illustrated in FIG. 4, a holding member 40 is attached to the second end portion of the shaft member 33. The holding member 40 includes a cylindrical portion 40a which is formed in a bottomed cylindrical or tubular shape, and the second end portion of the shaft member 33 is placed by insertion in the cylindrical portion 40a in a state where a predetermined clearance m is provided in a radial direction between the second end portion of the shaft member 33 and the cylindrical portion 40a. The holding member 40 includes a main body portion 40b formed in a plate shape extended outwardly in the radial direction from an opening side of the cylindrical portion 40a. The holding member 40 includes a seal member S being fixed to an outer circumferential portion of the main body portion 40b. The cylindrical portion 40a and the main body portion 40b are made from metal material, and the seal member S is made from rubber material. The cylindrical portion 40a and the main body portion 40b may be configured by resin material.

Figure 5:
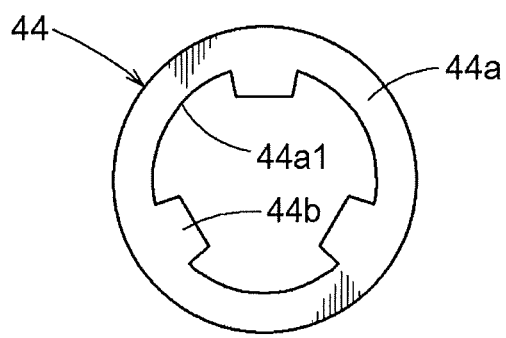
FIG. 5 is a plan view of a come-off prevention member disclosed here.

As illustrated in FIGS. 4 and 5, a come-off prevention member 44 (an example of an annular member) made of metal is fixed to a circumferential wall of the cylindrical portion 40a of the holding member 40. The come-off prevention member 44 includes plural extended portions 44b (an example of a protrusion) arranged at regular intervals in a circumferential direction in a state where the extended portions 44b are extended radially inward from an inner circumferential portion 44a1 of an annular main body 44a of the come-off prevention member 44. In the embodiment, the extended portions 44b are provided at three positions. The come-off prevention member 44 is insert-casted (insert-molded) in the circumferential wall of the cylindrical portion 40a in a state where the extended portions 44b are exposed from the cylindrical portion 40a towards the inner side in the radial direction, and thus the come-off prevention member 44 is integral with the cylindrical portion 40a. The extended portions 44b are configured to be tilted or inclined towards a bottom portion 40a1 of the cylindrical portion 40a relative to the annular main body 44a. As described above, according to the embodiment, the come-off prevention member 44 provided with the plural extended portions 44b are fixed to the holding member 40 in a simple manner, and accordingly the manufacturing is extremely easy.

The extended portions 44b of the come-off prevention member 44 may be provided at two positions, or at four or more positions. The extended portions 44b of the come-off prevention member 44 may be arranged at irregular intervals in the circumferential direction. A method in which the come-off prevention member 44 is insert-casted (insert-molded) in the cylindrical portion 40a of the come-off prevention member 44 is not limited to a particular way. The bottom portion 40a1 may be fixed, for example with adhesive, to the circumferential wall of the cylindrical portion 40a after the come-off prevention member 44 is insert-casted (insert-molded) in the circumferential wall of the cylindrical portion 40a. For example, the come-off prevention member 44 may be configured by a C ring (an example of the annular member) and may be embedded in a groove provided at the circumferential wall of the cylindrical portion 40a.

The valve element 34, which is connected to the second end portion of the shaft member 33, is formed by the main body portion 40b serving as a part of the holding member 40, and the seal member S fixed to the outer circumferential portion of the main body portion 40b. The second end portion of the shaft member 33 is configured by a first region 33a, a second region 33b, a third region 33c, a fourth region 33d and a fifth region 33e which are arranged in the stated order from a distal-end-side (that is, from a side at which the bottom portion 40a1 of the cylindrical portion 40a is provided).

The first region 33a is formed in a conical shape of which a diameter is reduced towards the bottom portion 40a1 of the cylindrical portion 40a, and the first region 33a includes a first contact portion 33a1 which is in contact with the bottom portion 40a1 of the cylindrical portion 40a. A distal end of the first region 33a is configured to include a spherical surface. The second region 33b is configured to include a hemispherical shape of which a diameter is reduced from a boundary surface P towards a side opposite to the bottom portion 40a1 of the cylindrical portion 40a. The boundary surface P is between the first region 33a and the second region 33b.

By inserting the shaft member 33 into the cylindrical portion 40a, the extended portions 44b of the come-off prevention member 44 become elastically deformed by the first region 33a towards the outer side in the radial direction. The deformed extended portions 44b ride over the boundary surface P and then the extended portions 44b come in contact with a second contact portion 33b1 of the second region 33b. Accordingly, the holding member 40 is kept in a state of being prevented from coming off the shaft member 33 in the direction of the axis X. In the embodiment, the extended portions 44b of the come-off prevention member 44 are configured to be inclined towards the bottom portion 40a1 of the cylindrical portion 40a, and therefore the first region 33a of the shaft member 33 may elastically-deform the extended portions 44b towards the outer side in the radial direction.

The second region 33b includes a transition portion 33b2 which transits linearly from the boundary surface P between the first region 33a and the second region 33b to a portion of the second region 33b, the portion which includes a predetermined curvature. The transition portion 33b2 may be omitted, and the entire outer surface of the second region 33b may be formed only of a curved surface.

A length of the first region 33a in the direction of the axis X is configured to be shorter than a radius of the second region 33b. In other words, a distance R1 from a center O of the boundary surface P to the first contact portion 33a1 is smaller than a distance R2 from the center O of the boundary surface P to the second contact portion 33b1. The first region 33a and the second region 33b are easily formed by cutting the second end portion of the shaft member 33 by lathe machining, for example, and thus a manufacturing cost can be reduced. In addition, because the first region 33a is formed such that the length of the first region 33a is short, an axial length of the shaft member 33 can be short, thereby making the air pressure control valve 3 compact.

The third region 33c is formed in a columnar shape which continues to the smallest diameter portion of the second region 33b. The fourth region 33d includes a tapered surface of which a diameter is increased from the connection portion, at which the fourth region 33d is connected with the third region 33c, towards a side opposite to the bottom portion 40a1. The fifth region 33e is formed in a columnar shape which continues to the largest diameter portion of the fourth region 33d and includes a groove portion 33e1 a part of which is recessed. An O ring 47 made of rubber is embedded in the groove portion 33e1. The O ring 47 is in contact with an outer surface of the shaft member 33 and with an inner surface of the circumferential wall of the cylindrical portion 40a, and is compressed. That is, the O ring 47 is provided between the shaft member 33 and the cylindrical portion 40a to be positioned at a side opposite to the bottom portion 40a1 of the cylindrical portion 40a relative to the second contact portion 33b1.

As explained above, because the second end portion of the shaft member 33 is disposed in the cylindrical portion 40a by insertion in a state where the predetermined clearance m is provided in the radial direction, the holding member 40 (the valve element 34) can swing or pivot in a predetermined range relative to the shaft member 33 while the first region 33a is in contact with the bottom portion 40a1 of the cylindrical portion 40a and the second region 33b is in contact with the extended portions 44b of the come-off prevention member 44. The disclosure is not limited to the configuration in which the holding member 40 swings or pivots relative to the shaft member 33, and a configuration may be employed in which the holding member 40 is fixed to the shaft member 33, and the shaft member 33 to which the holding member 40 is fixed swings or pivots.

The explanation will be made with reference back to FIGS. 2 and 3, the housing 32 is formed of the upper housing 32a and the lower housing 32b that are fastened to each other with a bolt in a state where an outer circumferential portion of the diaphragm 35 is held at a joint surface at which the upper housing 32a and the lower housing 32b are joined to each other in a manner that the outer circumferential portion is sandwiched between the upper housing 32a and the lower housing 32b. For example, the shaft member 33, the valve element 34, the diaphragm 35 and the compression spring 39 are accommodated in an accommodation space 32A of the housing 32.

A through hole 32a1 is provided at a lateral surface of the upper housing 32a. An upper chamber 32A1 defined and formed between the diaphragm 35 and the upper housing 32a, and an outside space portion 32B are in communication with each other via the through hole 32a1. Thus, the upper chamber 32A1 is maintained at an atmospheric pressure. When the valve element 34 is in the valve-closed state, a lower chamber 32A2 which is in communication with an inlet port 32C is formed in a space portion surrounded by the valve element 34, the lower housing 32b and the diaphragm 35 (refer to FIG. 3).

A cylindrical wall 32a4 is provided at an upper portion of the upper housing 32a. The cylindrical wall 32a4 includes a cylindrical or tubular shape and is extended downwardly (towards the valve element 34) from a motor fixing portion 32a3 fixing the stepping motor 31. The first end portion of the shaft member 33 is supported by the cylindrical wall 32a4.

The lower housing 32b includes the inlet port 32C through which the air and/or the water (vapor) flows in from the outlet of the air flow passage 5a of the fuel cell 5 and an outlet port 32D through which the air and/or the water (vapor) flow out to the downstream side of the oxygen-side discharge passage 2c when the valve element 34 is open. In the embodiment, the inlet port 32C is formed to open at a lateral portion of the lower housing 32b and the outlet port 32D is formed to open at a lower portion of the lower housing 32b.

A valve seat 46 including an annular or ring shape is provided at the lower housing 32b. The valve element 34 is configured to be in contact with the valve seat 46 to block the fluid communication between the inlet port 32C and the outlet port 32D. The valve seat 46 includes a contact portion 46a to which the seal member S of the valve element 34 is configured to be in contact. The valve seat 46 also includes a projecting portion 46b extended from the contact portion 46a towards an inner side in the radial direction while projecting towards an upper side relative to the contact portion 46a (that is, projecting towards the main body portion 40b). The contact portion 46a is configured by a flat surface serving as an upper surface or a top surface of a circumferential wall portion 32b1 of the lower housing 32b which configures the outlet port 32D. The projecting portion 46b is formed to project towards the upper side relative to a base end portion 46b2 which is extended radially inward to include a tapered configuration, from the circumferential wall portion 32b1 of the lower housing 32b which configures the outlet port 32D (that is, the projecting portion 46b is formed to project towards the valve element 34). The projecting portions 46b are provided at plural positions at regular intervals along the circumferential direction of the valve seat 46 and the projecting portions 46b are separated from each other in the circumferential direction. Thus, in a state where the seal member S is in contact with the contact portion 46a, a distal end portion 46b1 of each of the projecting portions 46b is in contact with the main body portion 40b of the valve element 34 thereby to restrict the valve element 34 from moving (refer to FIG. 7).

Figure 6:
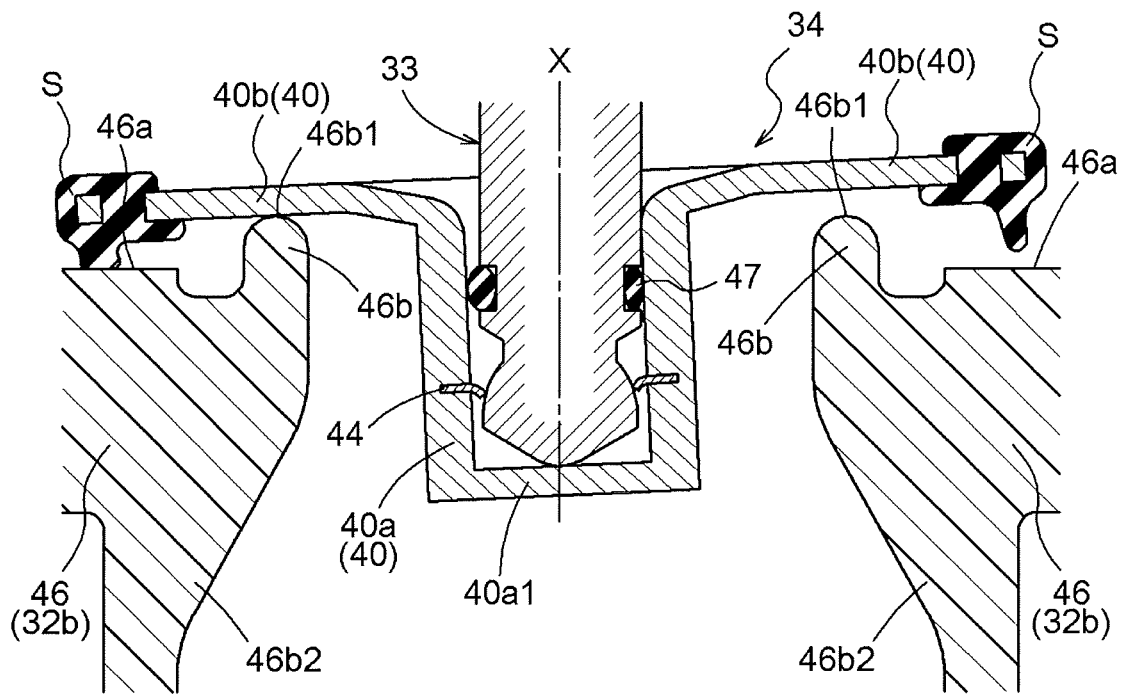
FIG. 6 is an enlarged view of the shaft member in a state where the valve starts to open.

When the valve element 34 is closed, parallelisms of the valve element 34 and the valve seat 46 may not coincide with each other due to fluid pressure that the valve element 34 receives from the fluid and/or dimensional error of components. Thus, for example, as illustrated in FIG. 6, when the shaft member 33 of which the second end portion is connected to the valve element 34 moves along the axis X, the seal member S at one side (that is, the left side in FIG. 6) is pressed or pushed against the contact portion 46a. At this time, the valve element 34 is in a state of being inclined relative to the shaft member 33 in such a manner that the predetermined clearance m at the right side in FIG. 6 is narrowed.

Figure 7:
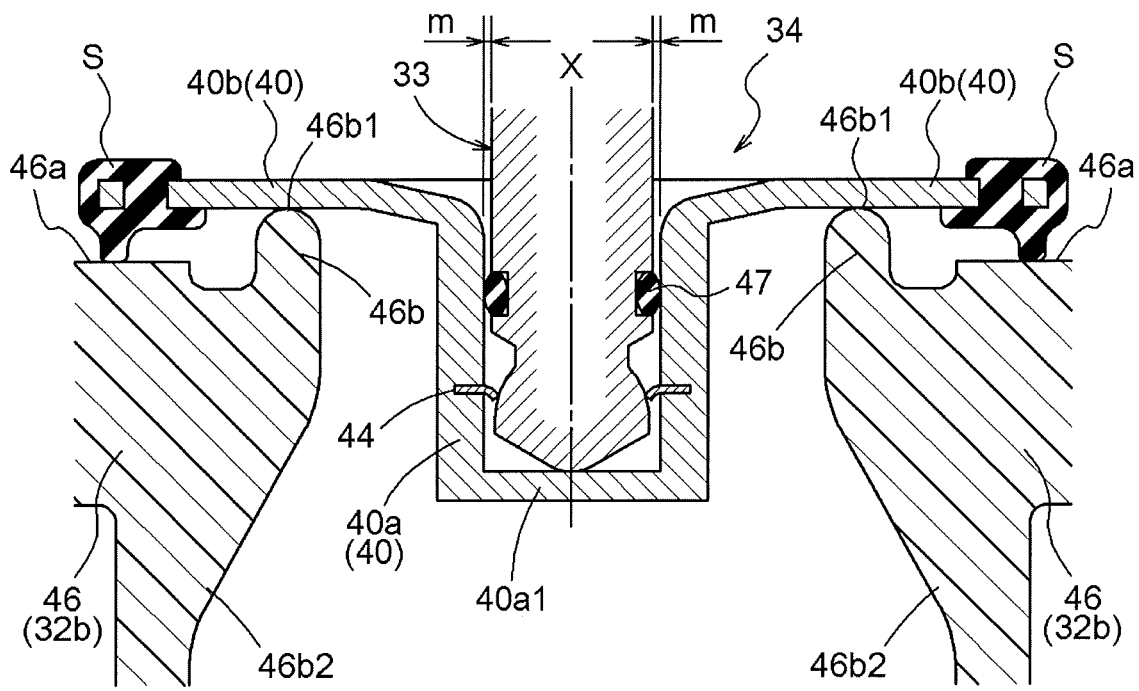
FIG. 7 is an enlarged view of the shaft member in a state where the valve has completely closed.

However, when the stepping motor 31 applies the drive force, which further moves the shaft member 33 downward, to the shaft member 33, as illustrated in FIG. 7, the projecting portion 46b at the left side in FIG. 7 serves as a fulcrum and a posture of the valve element 34 is corrected to be in the parallel posture relative to the valve seat 46. That is, the first contact portion 33a1 of the first region 33a slides relative to the bottom portion 40a1 of the cylindrical portion 40a, and the second contact portion 33b1 of the second region 33b slides relative to the three extended portions 44b that the second contact portion 33b1 faces, in such a manner that the predetermined clearance m is formed between the shaft member 33 and the cylindrical portion 40a.

At this time, the first region 33a and the second region 33b slide smoothly and the posture or orientation of the valve element 34 is reliably corrected such that the valve element 34 is parallel to the valve seat 46 because the distal end of the first region 33a is configured to include the spherical surface and the second region 33b is configured to include the hemispherical shape in the embodiment. As a result, the seal member S of the valve element 34 is pressed evenly against the valve seat 46 over the entire circumference of the valve seat 46, and thereby enhancing a sealing performance.

In the embodiment, by providing the O ring 47 between the shaft member 33 and the cylindrical portion 40a in such a manner that the O ring 47 is positioned at the side opposite to the bottom portion 40a1 of the cylindrical portion 40a relative to the second contact portion 33b1, foreign matters do not enter into an inner surface of the cylindrical portion 40a. Thus, the valve element 34 is not inhibited by the foreign matters from swinging relative to the shaft member 33. As a result, even in a case where the valve element 34 is closed repeatedly, the posture of the valve element 34 can be corrected for a long period of time. The O ring 47 also includes also a shock absorbing function of preventing the inner surface of the cylindrical portion 40a and the outer surface of the shaft member 33 from being in strong contact with each other when the holding member 40 is inclined relative to the shaft member 33, thereby reducing noise and/or vibration. The O ring 47 includes an alignment function or an axis alignment function for correcting, with elastic force or resilience force of the O ring 47, the posture of the valve element 34 such that the valve element 34 includes the parallel posture relative to the valve seat 46. Thus, the valve element 34 is restricted from being inclined in the valve-open state.

Figure 8:
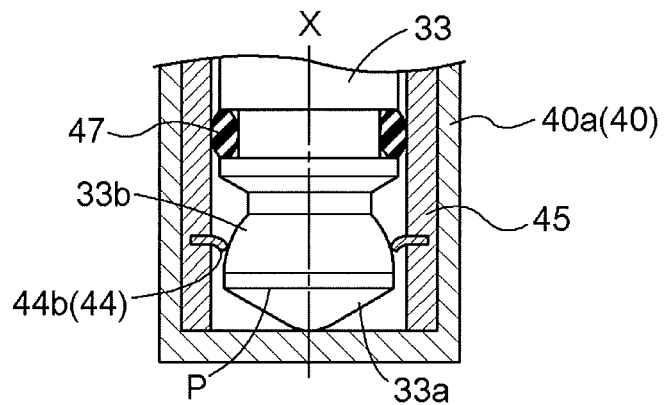
FIG. 8 is an enlarged view of a holding member according to a first alternative embodiment.

Other Alternative Embodiments (a) A first alternative embodiment disclosed here will be explained. As illustrated in FIG. 8, a first cylindrical member 45 to which the come-off prevention member 44 is fixed may be internally fitted in the cylindrical portion 40a of the holding member 40. The come-off prevention member 44 is insert-casted (insert-molded) in the first cylindrical member 45 to be integral with the first cylindrical member 45 in a state where the extended portions 44b are exposed from the first cylindrical member 45 towards the inner side in the radial direction. The first cylindrical member 45 including the come-off prevention member 44 is fitted in the cylindrical portion 40a of the holding member 40 by press-fitting, adhesion or welding, for example. In this embodiment, the first cylindrical member 45 to which the come-off prevention member 44 is fixed is prepared, and then the prepared first cylindrical member 45 is internally fitted in the cylindrical portion 40a, and thus the manufacturing is extremely easy.

Figure 9:
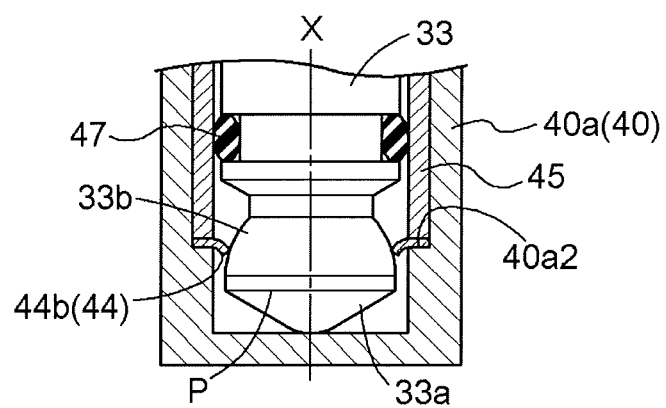
FIG. 9 is an enlarged view of a holding member according to a second alternative embodiment.

(b) A second alternative embodiment disclosed here will be explained. As illustrated in FIG. 9, a step portion 40a2 may be provided at the circumferential wall of the cylindrical portion 40a of the holding member 40, and the come-off prevention member 44 may be held in a sandwiched manner between the step portion 40a2 and the first cylindrical member 45 such that the come-off prevention member 44 is secured. As explained above, the first cylindrical member 45 is fitted in the cylindrical portion 40a of the holding member 40 by inner-fitting, and accordingly the position of the come-off prevention member 44 is prevented from being deviated in the direction of the axis X.

Figure 10:
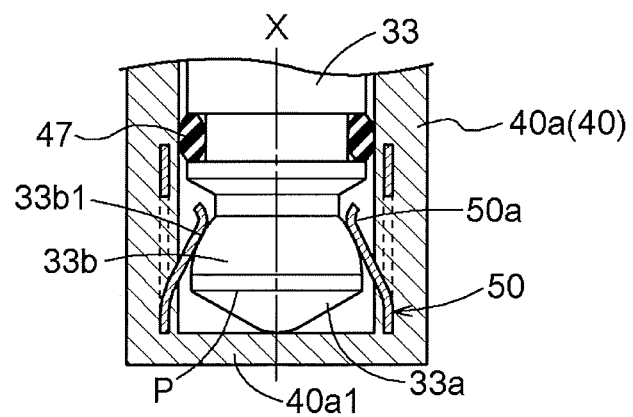
FIG. 10 is an enlarged view of a holding member according to a third alternative embodiment.
Figure 11:
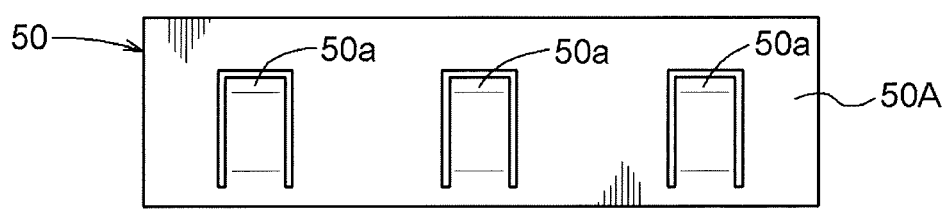
FIG. 11 is a developed view of a resilient member according to the third alternative embodiment.

(c) A third alternative embodiment disclosed here will be explained. As illustrated in FIG. 10, a resilient member 50 formed in a cylindrical or tubular shape and including plural bent portions 50a (an example of the protrusion) arranged at regular intervals in a state where each of the bent portions 50a is bent or curved towards the inner side in the radial direction may be fixed at the circumferential wall of the cylindrical portion 40a of the holding member 40. In this embodiment, the bent portions 50a are provided at three positions. As illustrated in FIG. 11, a sheet-shaped member 50A is formed by punching, and thereafter the bent portions 50a are bent by press machining and the sheet-shaped member 50A is bent or curved to form a cylindrical or tubular shape in a manner that the bent portions 50a are positioned at a radially inner side, thereby to form the resilient member 50 including the cylindrical or tubular shape. The resilient member 50 formed in the above-explained manner is insert-casted (insert-molded) in the cylindrical portion 40a to be integral with the cylindrical portion 40a in a state where the bent portions 50a are exposed from the cylindrical portion 40a towards the inner side in the radial direction.

By placing the shaft member 33 by insertion inside the cylindrical portion 40a, the bent portions 50a are elastically deformed by the first region 33a radially outward, the bent portions 50a ride over the boundary surface P, and the bent portions 50a come in contact with the second contact portion 33b1 of the second region 33b. Accordingly, the holding member 40 is kept in the state of being prevented from coming off the shaft member 33 in the direction of the axis X. In this embodiment, the mechanism in which the valve element 34 swings or pivots relative to the shaft member 33 is configured simply by fixing the resilient member 50 to the cylindrical portion 40a, and thus the manufacturing is extremely easy. A portion of the resilient member 50, the portion which is insert-casted (insert-molded) in the cylindrical portion 40a, is not limited to a particular portion. For example, an end surface of the resilient member 50 may be bent and be fixed to the bottom portion 40a1 of the cylindrical portion 40a.

Figure 12:
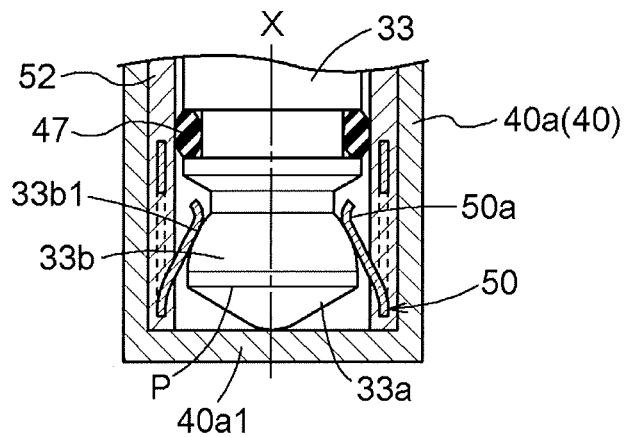
FIG. 12 is an enlarged view of a holding member according to a fourth alternative embodiment.

(d) A fourth alternative embodiment disclosed here will be explained. As illustrated in FIG. 12, a second cylindrical member 52 to which the resilient member 50 is fixed may be internally fitted in the cylindrical portion 40a of the holding member 40. The resilient member 50 is insert-cast (insert-molded) in the second cylindrical member 52 to be integral with the second cylindrical member 52, in a state where the bent portions 50a are exposed from the second cylindrical member 52 towards the inner side in the radial direction. The second cylindrical member 52 including the bent portions 50a is fitted in the cylindrical portion 40a of the holding member 40 by press-fitting, adhesion or welding, for example. In this embodiment, the second cylindrical member 52 to which the resilient member 50 is fixed is prepared, and then the prepared second cylindrical member 52 is internally fitted in the cylindrical portion 40a, and thus the manufacturing is extremely easy.

Figure 13:
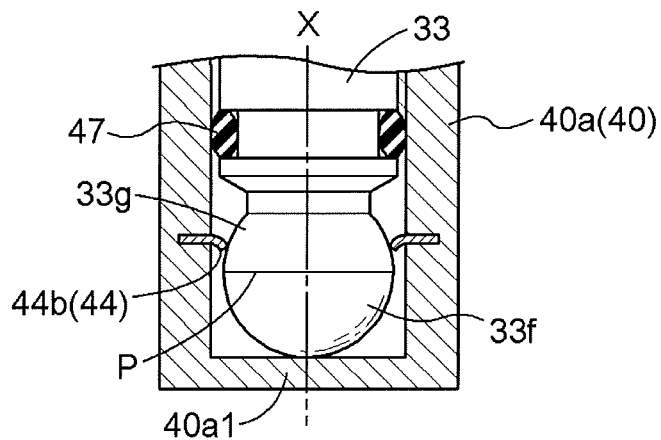
FIG. 13 is an enlarged view of a shaft member according to a fifth alternative embodiment.

(e) A fifth alternative embodiment disclosed here will be explained. As illustrated in FIG. 13, the second end portion of the shaft member 33 may be configured to include a spherical shape. That is, the second end portion of the shaft member 33 includes a first region 33f and a second region 33g. The first region 33f is configured to include a hemispherical shape of which a diameter is reduced towards the bottom portion 40a1 of the cylindrical portion 40a. The second region 33g is configured to include a hemispherical shape of which a diameter is reduced from a boundary surface P between the first region 33f and the second region 33g towards a side opposite to the bottom portion 40a1 of the cylindrical portion 40a. The fifth alternative embodiment differs from the aforementioned embodiment in that the first region 33f including the hemispherical shape is employed in the fifth alternative embodiment instead of the first region 33a including the conical shape explained in the aforementioned embodiment.

Figure 14:
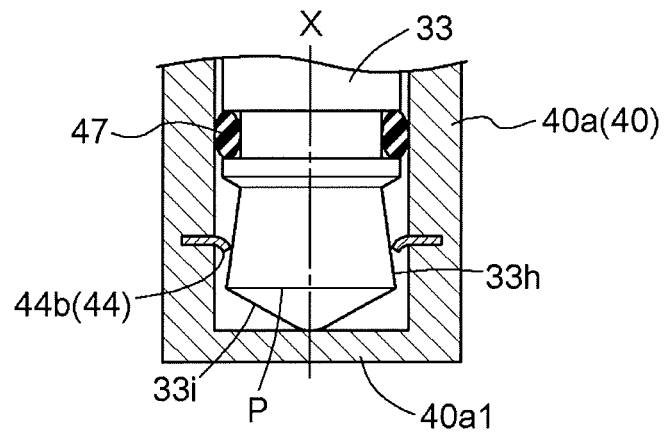
FIG. 14 is an enlarged view of a shaft member according to a fifth alternative embodiment.

(f) A sixth alternative embodiment disclosed here will be explained. As illustrated in FIG. 14, the second end portion of the shaft member 33 may include a first region 33i formed in a conical shape of which a diameter is reduced towards the bottom portion 40a1 of the cylindrical portion 40a, and a second region 33h configured to include a tapered shape of which a diameter is reduced from a boundary surface P between the first region 33i and the second region 33h towards a side opposite to the bottom portion 40a1 of the cylindrical portion 40a. The sixth alternative embodiment differs from the aforementioned embodiment in that the second region 33h including the tapered shape is employed in the sixth alternative embodiment instead of the second region 33b including the hemispherical shape explained in the aforementioned embodiment.

(g) The protrusion protruding towards the inner side in the radial direction of the cylindrical portion 40a is not limited to the examples explained in the aforementioned embodiments. For example, the circumferential wall of the cylindrical portion 40a may include a through hole and a member including, for example, a pin shape, may be fitted in the through hole.

(h) In the aforementioned embodiments, the inlet port 32C is provided at the lateral portion of the lower housing 32b and the outlet port 32D is provided at the lower portion of the lower housing 32b, however, the inlet port 32C and the outlet port 32D may be switched with each other. In this case, the inlet port 32C of the aforementioned embodiments is replaced with the outlet port 32D of the aforementioned embodiments, and the outlet port 32D is replaced with the inlet port 32C.

(i) In the embodiments disclosed here, the explanation is made on the fluid control valve used in the fuel cell system 1, however, the disclosure is not limited thereto and may be used for other fluid control valve for a vehicle or for a fluid control valve for a household appliance.

This disclosure is applicable to a fluid control valve controlling an amount of flow of fluid and pressure of the liquid.

According to the aforementioned embodiments, an air pressure control valve 3 (i.e., fluid control valve) includes a shaft member 33 including a first end portion and a second end portion, and the shaft member 33 is configured to move along an axis X by drive force from a stepping motor 31 (i.e., drive source) connected to the first end portion. A holding member 40 includes a cylindrical portion 40a which is formed in a bottomed cylindrical shape and in which the second end portion of the shaft member 33 is placed by insertion with a predetermined clearance m provided in a radial direction between the cylindrical portion 40a and the second end portion of the shaft member 33. The holding member 40 includes a valve element 34 configured by a main body portion 40b formed in a plate shape extended radially outward from the cylindrical portion 40a and a seal member S fixed to an outer circumferential portion of the main body portion 40b. A housing 32 includes an inlet port 32C for fluid, an outlet port 32D for the fluid, and a valve seat 46 formed in an annular shape wherein the valve element 34 is configured to be in contact with the valve seat 46 such that communication between the inlet port 32C and the outlet port 32D is blocked. The housing 32 accommodates the shaft member 33 and the holding member 40. The cylindrical portion 40a includes an extended portion 44b (i.e., protrusion) or a bent portion 50a (i.e., protrusion) protruding radially inward. The second end portion of the shaft member 33 includes a first region 33a, 33f, 33i including a diameter reduced towards a bottom portion 40a1 of the cylindrical portion 40a. The first region 33a, 33f, 33i includes a first contact portion 33a1 configured to be in contact with the bottom portion 40a1. The second end portion of the shaft member 33 includes a second region 33b, 33g, 33h including a diameter reduced from a boundary surface P between the first region 33a, 33f, 33i and the second region 33b, 33g, 33h towards a side opposite to the bottom portion 40a1. The second region 33b, 33g, 33h includes a second contact portion 33b1 which is in contact with the extended portion 44b (i.e., protrusion) or the bent portion 50a (i.e., protrusion).

According to the above-described configuration, at the second end portion of the shaft member 33, the first region 33a, 33f, 33i is in contact with the bottom portion 40a1 of the cylindrical portion 40a and the second region 33b, 33g, 33h of which the diameter is reduced towards the side opposite to the bottom portion 40a1 is in contact with the extended portion 44b (i.e., protrusion) or the bent portion 50a (i.e., protrusion) of the cylindrical portion 40a. Thus, the holding member 40 is restricted from moving in a direction of the axis X relative to the shaft member 33. In this state, the shaft member 33 is placed by insertion in the cylindrical portion 40a with the predetermined clearance m is provided in the radial direction, and thus the holding member 40 including the valve element 34 can swing or pivot relative to the shaft member 33. As a result, when the drive force in the direction of the axis X is applied to the shaft member 33 and the valve element 34 is pressed against the valve seat 46, the valve element 34 swings or moves relative to the shaft member 33 and thus the seal member S of the valve element 34 is pressed against the valve seat 46 along the entire circumference. Consequently, sealing performance is enhanced even in a case where parallelisms of the valve element 34 and the valve seat 46 do not coincide with each other.

The mechanism in which the valve element 34 swings or pivots relative to the shaft member 33 is configured simply by cutting the second end portion of the shaft member 33 by lathe machining and providing the extended portion 44b or the bent portion 50a to the holding member. Thus, compared to a conventional case in which a through hole is provided at the end portion of the shaft member and/or the holding member is clinched from an outside, manufacturing cost is lower and process is easier. As described above, according to the above-described embodiment, the fluid control valve is obtained in which a desired seal function is ensured while the manufacturing efficiency is enhanced.

According to the aforementioned embodiments, a come-off prevention member 44 (i.e., annular member) is fixed to the cylindrical portion 40a, and the come-off prevention member 44 includes plural extended portions 44b extended radially inward. The protrusion is configured by the plural extended portions 44b.

According to the above-described configuration, the mechanism in which the valve element 34 swings or pivots relative to the shaft member 33 is configured simply by fixing the come-off prevention member 44, which includes the plural extended portions 44b extended radially inward, to the cylindrical portion 40a of the holding member 40. Consequently, the manufacturing is extremely easy.

According to the aforementioned embodiments, a first cylindrical member 45 is internally fitted in the cylindrical portion 40a, and the come-off prevention member 44 (i.e., annular member) is fixed to the first cylindrical member 45.

According to the above-described configuration, by simply preparing the first cylindrical member 45 to which the come-off prevention member 44 is fixed, and then by fitting the prepared first cylindrical member 45 into the cylindrical portion 40a of the holding member 40 by inner-fitting, the extended portion 44b (i.e., protrusion) can be provided. Consequently, the manufacturing is extremely easy.

According to the aforementioned embodiments, a resilient member 50 is fixed to the cylindrical portion 40a and the resilient member 50 includes plural bent portions 50a bent radially inward. The protrusion 50a is configured by the plural bent portions 50a.

According to the above-described configuration, the mechanism in which the valve element 34 swings or pivots relative to the shaft member 33 is configured simply by fixing the resilient member 50, which includes the plural bent portions 50a bent radially inward, to the cylindrical portion 40a of the holding member 40. Consequently, the manufacturing is extremely easy.

According to the aforementioned embodiments, a second cylindrical member 52 is internally fitted in the cylindrical portion 40a and the resilient member 50 is fixed to the second cylindrical member 52.

According to the above-described configuration, by simply preparing the second cylindrical member 52 to which the resilient member 50 is fixed and then by internally fitting the prepared second cylindrical member 52 into the cylindrical portion 40a of the holding member 40, the bent portion 50a (i.e., protrusion) can be provided. Consequently, the manufacturing is extremely easy.

According to the aforementioned embodiments, a distance R1 from a center O of the boundary surface P to the first contact portion 33a1 is configured to be smaller than a distance R2 from the center O of the boundary surface P to the second contact portion 33b1.

According to the above-described configuration, at the second end portion of the shaft member 33, the dimension of the first region 33a, 33f, 33i in the direction of the axis X is configured to be small, and thereby reducing an axial length of the air pressure control valve 3.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A fluid control valve comprising:
a shaft member including a first end portion and a second end portion, the shaft member being configured to move along an axis by drive force from a drive source connected to the first end portion;
a holding member including a cylindrical portion which is formed in a bottomed cylindrical shape and in which the second end portion of the shaft member is placed by insertion with a predetermined clearance provided in a radial direction between the cylindrical portion and the second end portion of the shaft member;
the holding member including a valve element configured by a main body portion formed in a plate shape extended radially outward from the cylindrical portion and a seal member fixed to an outer circumferential portion of the main body portion;
a housing including an inlet port for fluid, an outlet port for the fluid, and a valve seat formed in an annular shape wherein the valve element is configured to be in contact with the valve seat such that communication between the inlet port and the outlet port is blocked, the housing accommodating the shaft member and the holding member;
the cylindrical portion including a protrusion protruding radially inward;
the second end portion of the shaft member including a first region including a diameter reduced towards a bottom portion of the cylindrical portion, the first region including a first contact portion configured to be in contact with the bottom portion; and
the second end portion of the shaft member including a second region including a diameter reduced from a boundary surface between the first region and the second region towards a side opposite to the bottom portion, the second region including a second contact portion being in contact with the protrusion.

2. The fluid control valve according to claim 1, wherein an annular member is fixed to the cylindrical portion and the annular member includes a plurality of extended portions extended radially inward, and
the protrusion is configured by the plurality of extended portions.

3. The fluid control valve according to claim 2, wherein a first cylindrical member is internally fitted in the cylindrical portion and the annular member is fixed to the first cylindrical member.

4. The fluid control valve according to claim 3, wherein a distance from a center of the boundary surface to the first contact portion is configured to be smaller than a distance from the center of the boundary surface to the second contact portion.

5. The fluid control valve according to claim 2, wherein a distance from a center of the boundary surface to the first contact portion is configured to be smaller than a distance from the center of the boundary surface to the second contact portion.

6. The fluid control valve according to claim 1, wherein a resilient member is fixed to the cylindrical portion and the resilient member includes a plurality of bent portions bent radially inward, and the protrusion is configured by the plurality of bent portions.

7. The fluid control valve according to claim 6, wherein a second cylindrical member is internally fitted in the cylindrical portion and the resilient member is fixed to the second cylindrical member.

8. The fluid control valve according to claim 7, wherein a distance from a center of the boundary surface to the first contact portion is configured to be smaller than a distance from the center of the boundary surface to the second contact portion.

9. The fluid control valve according to claim 6, wherein a distance from a center of the boundary surface to the first contact portion is configured to be smaller than a distance from the center of the boundary surface to the second contact portion.

10. The fluid control valve according to claim 1, wherein a distance from a center of the boundary surface to the first contact portion is configured to be smaller than a distance from the center of the boundary surface to the second contact portion.

* * * * *